United States Patent [19]

Hadziomerovic

[11] Patent Number: 4,531,211
[45] Date of Patent: Jul. 23, 1985

[54] MULTIPLEXER FOR BIT ORIENTED PROTOCOL DATA LINK CONTROL

[75] Inventor: Faruk Hadziomerovic, Kanata, Canada

[73] Assignee: Northern Telecom Limited, Montreal, Canada

[21] Appl. No.: 581,808

[22] Filed: Feb. 21, 1984

[30] Foreign Application Priority Data

Dec. 23, 1983 [CA] Canada ................... 444271

[51] Int. Cl.³ ............................. H04J 3/06; H04J 3/04
[52] U.S. Cl. ..................................... 370/102; 370/112
[58] Field of Search ................. 370/100, 102, 112, 94, 370/60, 92

[56] References Cited

U.S. PATENT DOCUMENTS

| | | | |
|---|---|---|---|
| 4,161,719 | 7/1979 | Parikh et al. | 370/102 |
| 4,196,315 | 4/1980 | Boutmy et al. | 370/102 |
| 4,225,919 | 9/1980 | Kyu et al. | 364/200 |
| 4,423,414 | 12/1983 | Bryant et al. | 370/94 |

*Primary Examiner*—Douglas W. Olms
*Assistant Examiner*—Wellington Chin
*Attorney, Agent, or Firm*—R. John Haley

[57] ABSTRACT

A bit oriented protocol (e.g. HDLC) data link control multiplexer and demultiplexer are described for handling 256 channels whose data are time division multiplexed in pairs of bits in a serial data stream. The multiplexer and demultiplexer relieve a processor of an associated telephone or packet data switching office from the tasks of multiplexing and demultiplexing, formatting data link control frames, providing CRC checks, and inserting and removing zero bits to distinguish messages from flag bytes. The multiplexer and demultiplexer each include several shift registers for the serial bit stream information, byte boundary indication, CRC data, and effecting zero bit insertion and removal.

12 Claims, 17 Drawing Figures

MULTIPLEXER FOR BIT ORIENTED PROTOCOL DATA LINK CONTROL

This invention relates to a bit oriented protocol (BOP) data link control (DLC) multiplexer.

Reference is directed to my co-pending patent application No. filed simultaneously herewith and entitled "Demultiplexer for bit oriented protocol data link control", the claims of which are directed to the demultiplexer described herein.

BOPs and devices therefor are known and have been implemented for single channels in integrated circuit devices such as Motorola, Inc.'s MC6854 and Intel Corp.'s 8273 data link controller chips. Examples of BOPs are SDLC (Synchronous DLC), HDLC (High Level DLC), and ADCCP (Advanced Data Communications Control Procedure). For an overview of BOPs reference is directed to the introductory parts of Kyu et al. U.S. Pat. No. 4,225,919 issued Sept. 30, 1980 and entitled "Advanced Data Link Controller".

With increasing data communications, a need exists to facilitate transmission of multiple DLC channels over a single communications path extending for example between a telecommunications switching office and a remote packet data node, each of which includes a processor for handling the desired switching functions. At the same time, it is desirable to relieve such processors from the tasks of formatting messages into DLC frames with framing flags, CRC (cyclic redundancy check) bytes, and inserted zero bits to prevent the occurrence of flags during messages on a channel.

Whilst multiple DLC channels on a single path could be provided by multiplexing the outputs from single channel controllers provided one for each channel, such an approach is inconvenient and expensive, and tends to be impractical for large numbers of multiplexed channels. For example, each DLC channel may comprise data at a bit rate of 16 kb/s, so that 256 such channels can be time multiplexed on a 4.096 MHz serial transmission link. However, using known single channel DLC controllers this would require 256 data link controller integrated circuits.

Accordingly, an object of this invention is to facilitate transmission of multiplexed DLC channels.

According to this invention there is provided apparatus for transmitting messages from a plurality of channels in a time division multiplexed serial bit stream using bit oriented protocol frames, each frame comprising at least an opening flag byte and a plurality of message bytes comprising bytes of a message of a respective channel to be transmitted, the flag byte comprising a sequence of a predetermined number of consecutive 1 bits and the bits of the message bytes being subject to zero bit insertion whereby occurrence of the flag byte within the message is avoided, the apparatus comprising: first and second memory means; means for deriving said serial bit stream from the first memory means; means responsive to a message of a channel to be transmitted for storing a flag byte in the first memory means and for storing in the second memory means an indication of the relative position in the first memory means of the flag byte; and means, responsive to said indication stored in the second memory means as said serial bit stream is derived from the first memory means, for: providing a message byte to be transmitted; effecting said zero bit insertion; storing the byte with any inserted zero bits in the first memory means; and updating said indication stored in the second memory means in dependence upon the number of inserted zero bits.

The invention will be further understood from the following description with reference to the accompanying drawings, in which.

Figure 1:
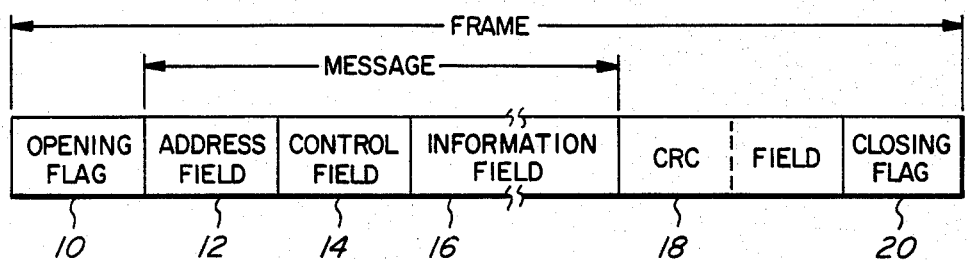
FIG. 1 illustrates the known form of an HDLC frame.
Figure 2A:
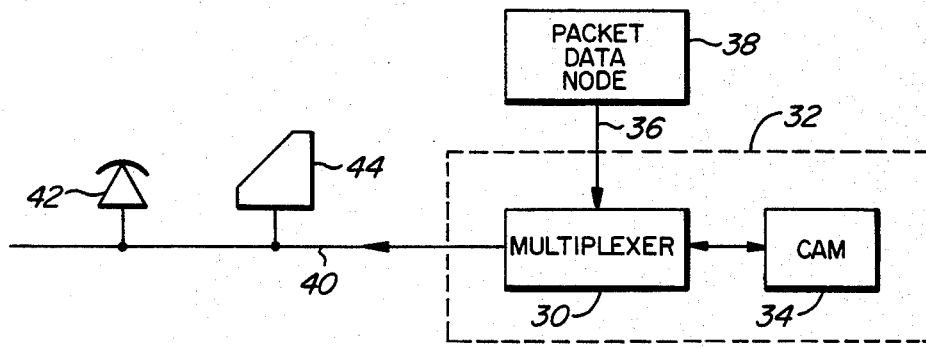
FIGS. 2a and 2b illustrate two applications of an HDLC multiplexer in accordance with an embodiment of the invention.
Figure 2B:
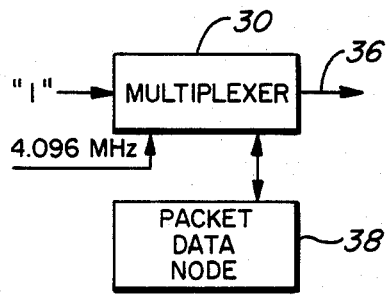
Figure 7:
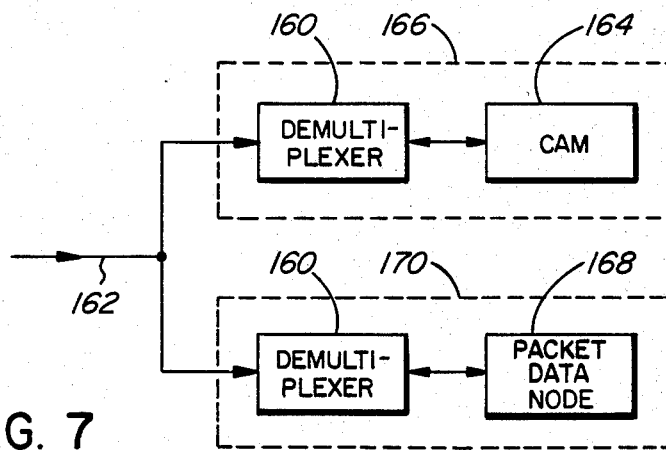
Figure 3A:
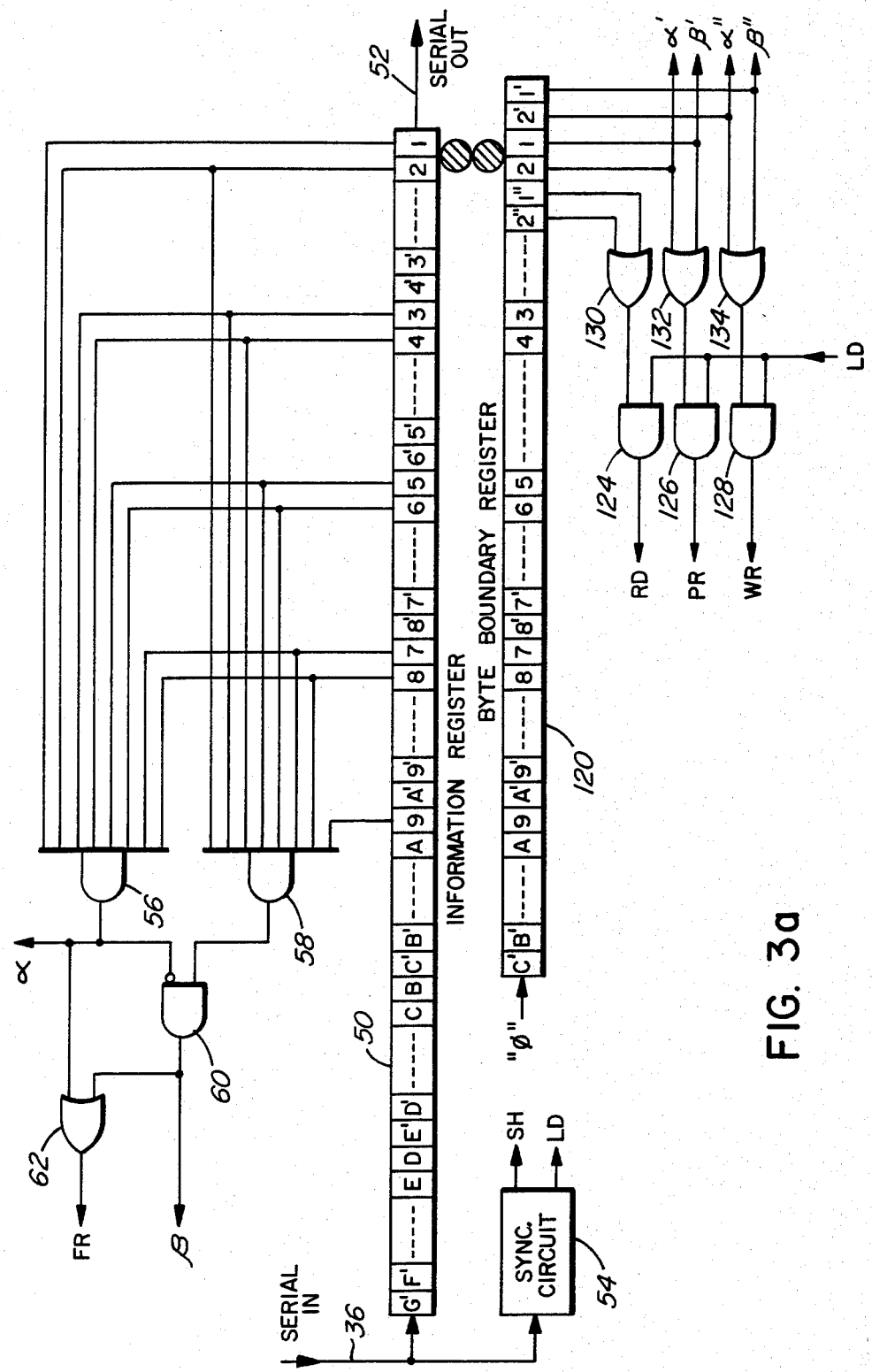
Figure 3B:
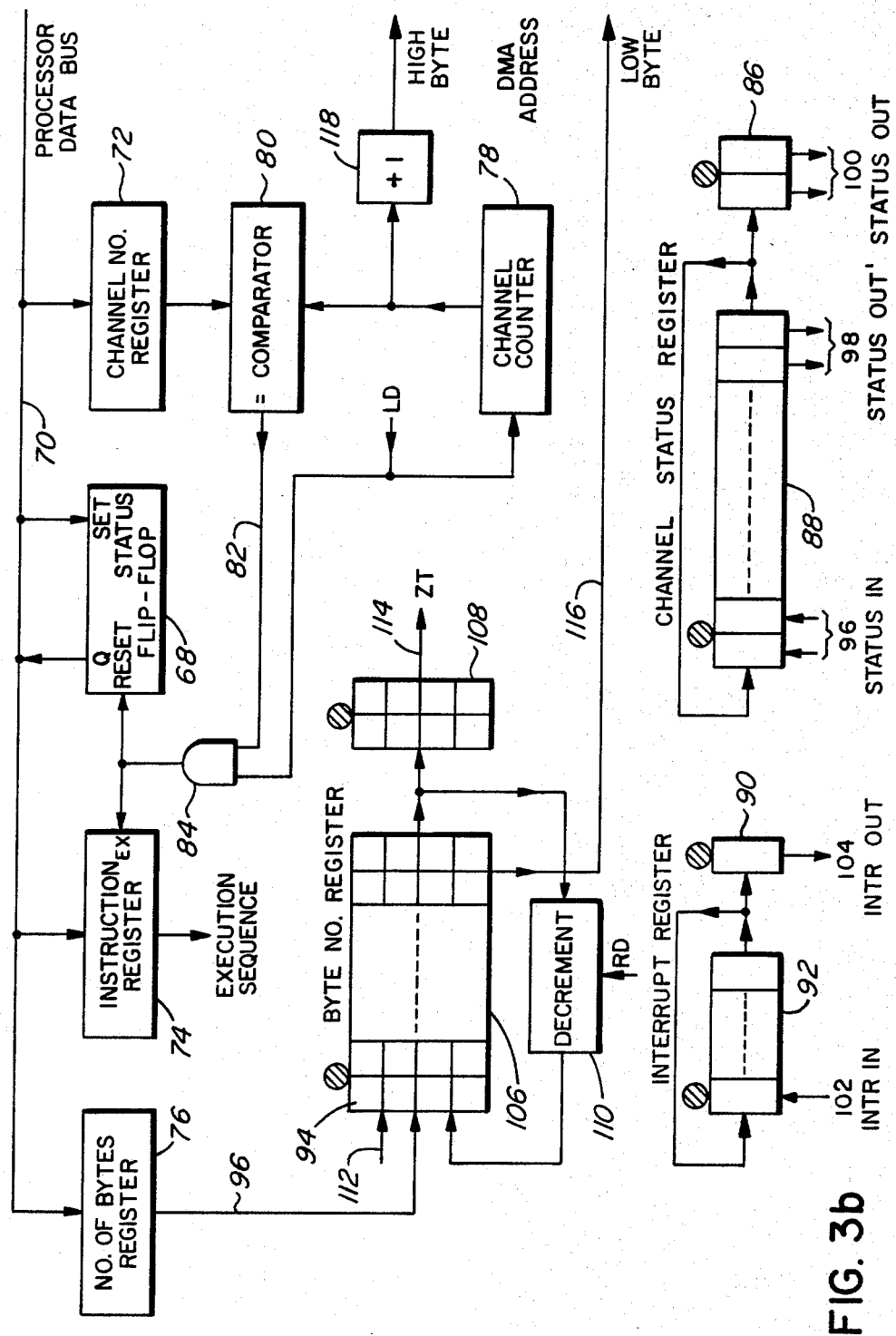
Figure 3C:
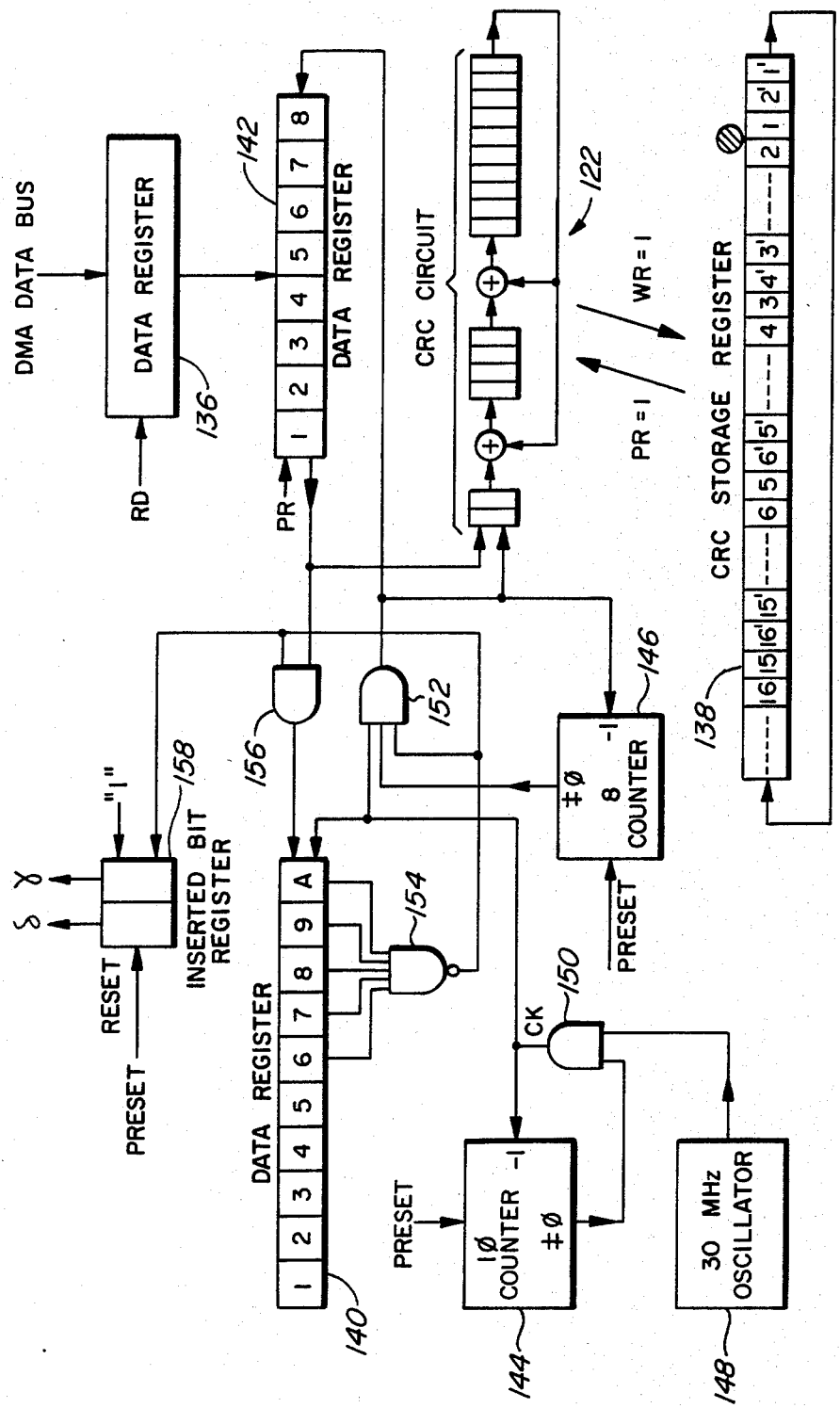
Figure 4:
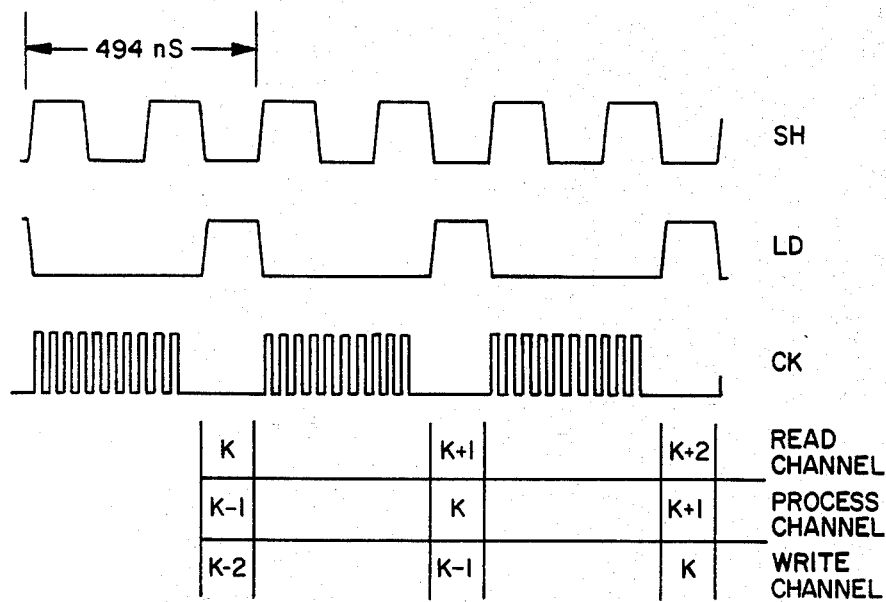
Figure 5:
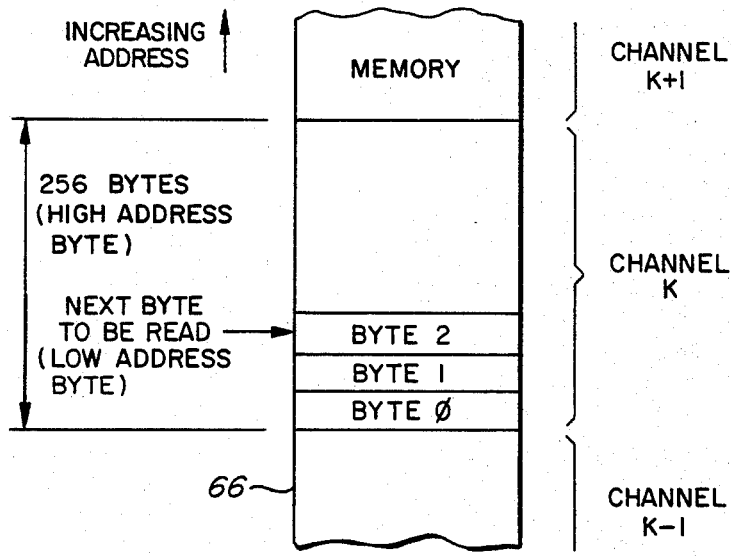
Figure 8A:
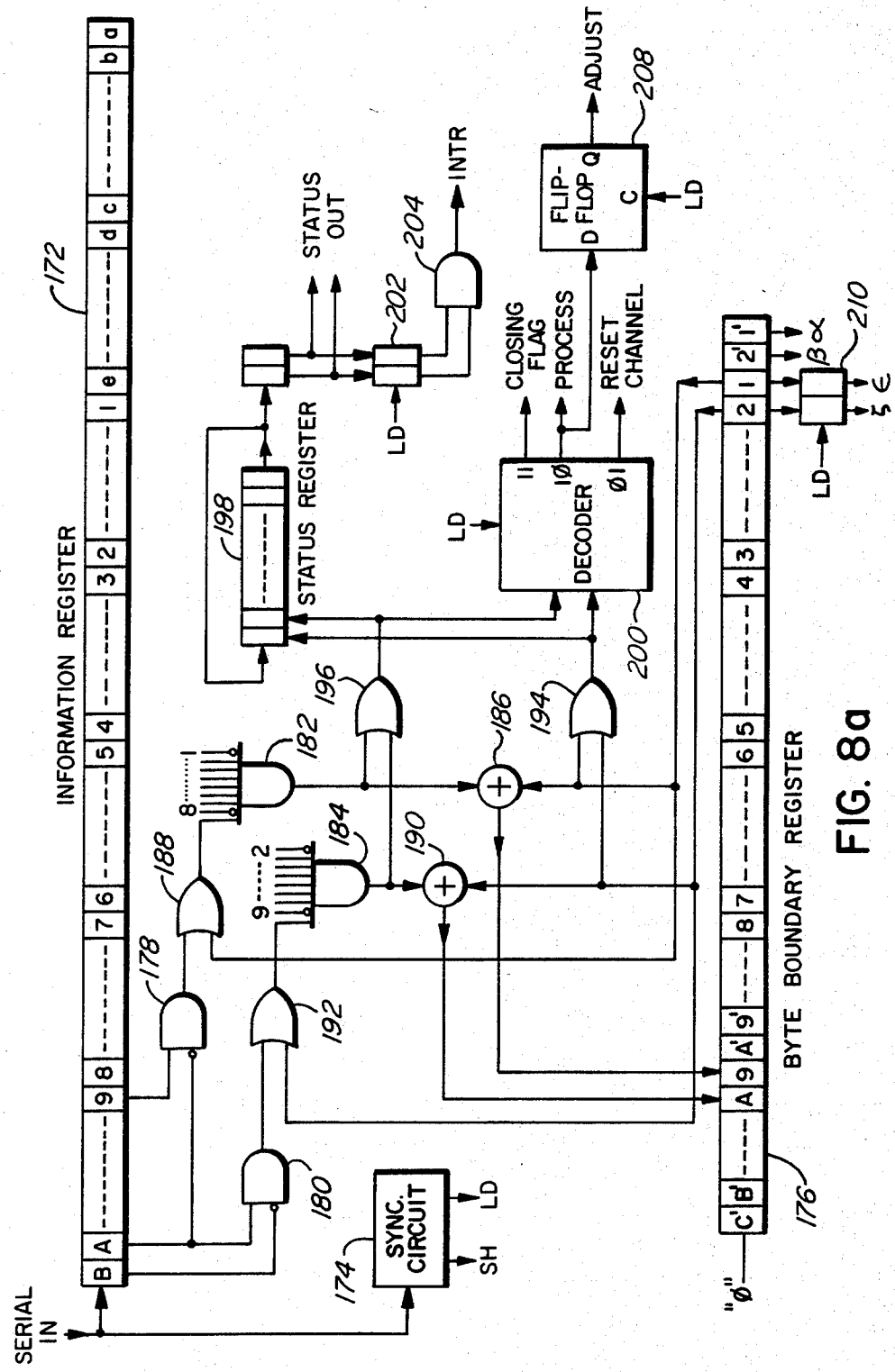
Figure 8B:
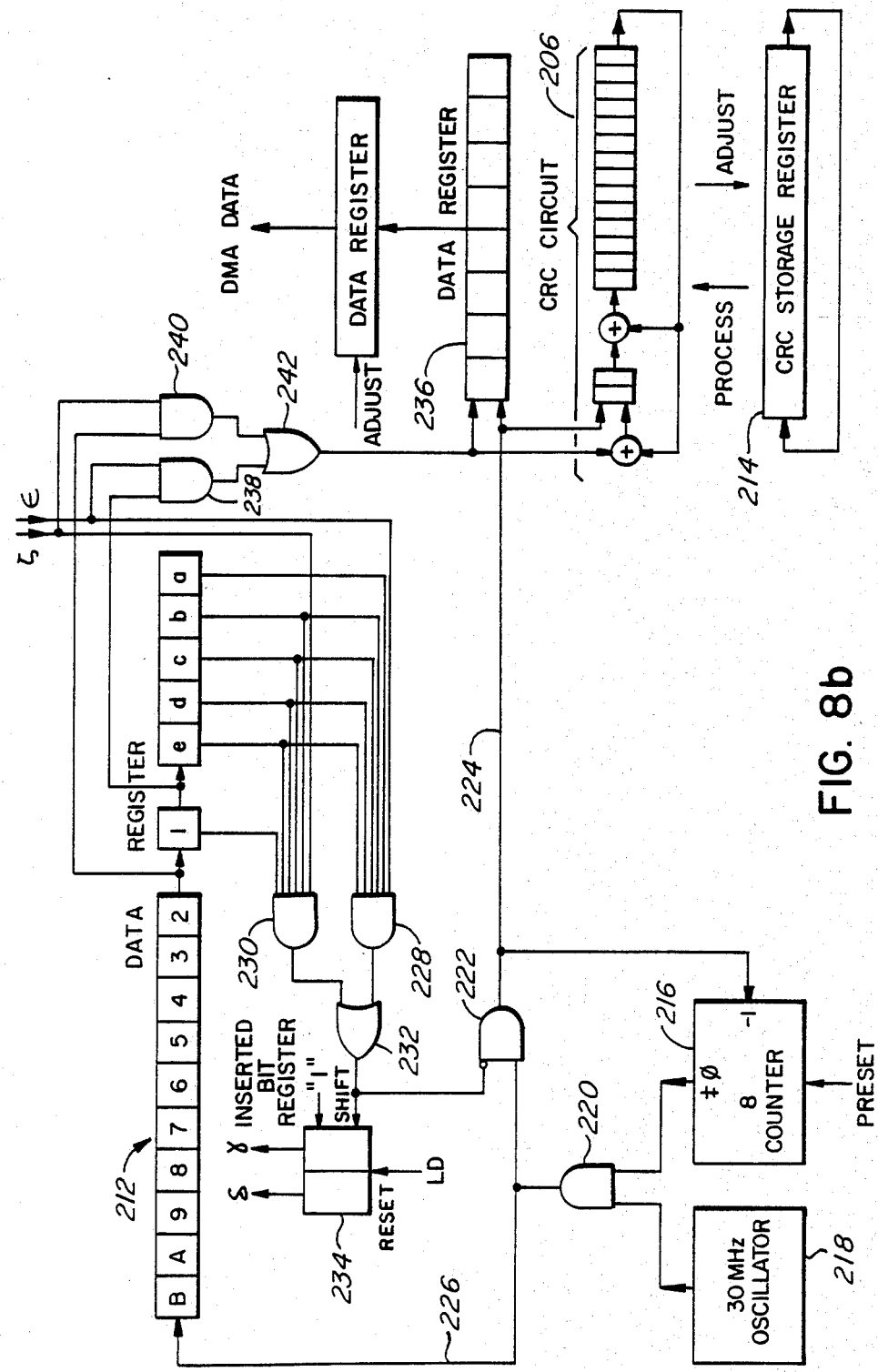

FIG. 3a schematically illustrates information and byte-boundary registers of the multiplexer;

FIG. 3b schematically illustrates processor interface circuitry of the multiplexer;

FIG. 3c schematically illustrates zero bit insertion and cyclic redundancy checking (CRC) circuitry of the multiplexer;

FIG. 4 is a timing diagram illustrating signals which occur during operation of the multiplexer;

FIG. 5 schematically illustrates a buffer memory of the processor for access by the multiplexer;

FIGS. 6a to 6f show flow charts illustrating operating sequences of the multipexer;

FIG. 7, which appears on the same sheet as FIGS. 1, 2a, and 2b, illustrates applications of an HDLC demultiplexer; and FIGS. 8a and 8b schematically illustrate registers and circuitry of part of the demultiplexer.

Referring to FIG. 1, there is shown the known form of an HDLC frame, which comprises an opening flag 10, an address field 12, a control field 14, an information field 16, a CRC (cyclic redundancy check) field 18, and a closing flag 20. In the following description, the address field 12, control field 14, and information field 16 are referred to collectively as a message, which may comprise up to 256 8-bit bytes.

The multiplexer described below serves to multiplex messages from 256 individual channels onto a single serial transmission path, adding to each message the necessary opening flag 10, CRC field 18, and closing flag 20. The CRC field 18 consists of two 8-bit bytes. The opening and closing flags 10 and 20 are identical, each flag being constituted by the 8-bit byte ⌀1111111⌀. In order to prevent this sequence from occurring within the message or the CRC field, the multiplexer also provides zero bit insertion in the message and CRC fields in that it inserts an additional zero bit following any sequency of five consecutive ones during these fields for the same channel. The manner in which this is achieved is fully described below.

FIG. 2a illustrates one application of the multiplexer. In this application the multiplexer 30 is co-located with a telephone central office switch, as shown by a broken-line box 32, which includes a so-called customer access module, or CAM, 34. The CAM 34 interacts with the multiplexer 30 as described below for handling digital signalling information for 256 telephone channels. This signalling information is interleaved by the multiplexer 30 with serial data for 256 data channels in HDLC format incoming via a serial transmission link 36 from a remote packet data node 38. The multiplexer 30 supplies a resultant serial data stream to a serial data transmission link 40, such as a digital subscriber loop, and thence to addressable devices coupled thereto such as digital telephones 42 and data terminals 44, only one of each of which is illustrated.

FIG. 2b illustrates a second application of the multiplexer 30, in this case at the packet data node 38 for producing serial data in HDLC format for 256 channels on the serial transmission link 36. In this case the multiplexer 30 does not interleave HDLC frames of signalling information with HDLC frames of data, but merely produces the multiplexed HDLC data frames. To this end the multiplexer 30 is supplied at its serial input with a constant logic one as illustrated in FIG. 2b, and is also supplied with an external clock frequency of 4.096 MHz. This frequency corresponds to a transmission rate of 16 kb/s for each of the 256 channels.

The arrangement and operation of the multiplexer 30 are described below with reference to FIGS. 3a, 3b, and 3c, collectively referred to as FIG. 3.

Serial data incoming from the transmission link 36 is applied to a serial input of a 3584-bit information shift register 50 (FIG. 3a), a serial output of which constitutes the serial data output of the multiplexer on a line 52. The term "shift register" is abbreviated in the following description to "register". The incoming data is also applied to a synchronizing and clock recovery circuit 54, which produces signals SH and LD which are illustrated in FIG. 4. The signal SH has a frequency of 4.096 MHz, corresponding to the serial data rate on the transmission link 36 and on the line 52. Accordingly, the signal SH is applied as a clock signal to the register 50 to shift the data therethrough.

At any instant the information register 50 stores 14 bits of each of the 256 channels. As shown in FIG. 3a, the 14 bits of one channel are stored as 7 pairs of bits in bit positions 1,2; 3,4;...D,E. The 14 bits of another channel are similarly stored in pairs at bit positions 3',4'; 5',6'; ... F',G'. The bits of each channel are stored in pairs for convenience of providing two adjacent bits in individual multiplex frames supplied to the subscribers coupled to the subscriber loop 40. Accordingly, the circuit 54 produces one pulse of the signal LD for every two pulses of the signal SH, as shown in FIG. 4.

It is assumed that the HDLC option of all bits between successive HDLC frames on the same channel being a logic "1" is effected for the data on the transmission link 36. Accordingly, a channel is determined to be idle or free if eight successive ones are present. This situation is detected by two 8-input AND gates 56 and 58, whose inputs are coupled to outputs of bit positions 1 to 8 and 2 to 9 respectively of the register 50. If bit positions 1 to 8 of the register 50 are all "1"s the gate 56 produces a signal $\alpha=1$ and inhibits a gate 60. If the register 50 has a "0" in bit position 1 and "1"s in bit positions 2 to 9 the gate 60 produces a signal $\beta=1$. In either case a gate 62 produces a signal FR=1 when the channel is idle or free. This signal FR=1 is used to set a channel-idle status in a channel status register 88 (FIG. 3b) as described below.

While channels on the transmission link 36 are not free, their information is passed serially through the information register 50 to the output line 52 unchanged. When a channel becomes free, information can be inserted on the channel by the multiplexer in the manner described below. It should now be appreciated that in the application of the multiplexer shown in FIG. 2b, the logic "1" applied to the serial input of the multiplexer 30 is equivalent to a situation in which all of the incoming channels are always idle or free.

In order to insert information on a channel, a processor of the CAM 34 (FIG. 2a) or of the packet data node 38 (FIG. 2b) initially loads a memory with this information, which consists of a message of up to 256 8-bit bytes as already explained with reference to FIG. 1. Accordingly, this memory is conveniently a 64 Kbyte memory providing storage for up to 256 bytes for each of the 256 channels. The organization of part of such a memory is shown in FIG. 5. As illustrated any 256-byte portion of this memory 66 which is allocated to a particular channel K is selectable by a high address byte, and any one of the 256 bytes in this portion is selectable by a low address byte, of an address which is supplied as described below for direct memory access (DMA).

The processor loads the message to be sent on a channel into the portion of the memory 66 allocated to the channel, with the last byte to be sent at the lowest address. For example, if the message consists of a single address byte (field 12), a single control byte (field 14), and a single information byte (field 16), then these bytes would be loaded into the byte positions 2, 1, and 0 respectively and would be read out by DMA in this order as described below.

After loading the message into the memory 66, the processor addresses a multiplexer status flip-flop 68 (FIG. 3b) to determine via its data bus 70 whether or not the multiplexer 30 is free to accept an instruction. If it is free the flip-flop 68 is not set (its output Q=0), and the processor accordingly sets this flip-flop 68 via the data bus 70, loads a channel number register 72 with the relevant channel number (or high address byte), an 8-bit instruction register 74 with an instruction, and, in the case of a message to be sent, loads a byte number register 76 with a number which is one less than the number of bytes of the message to be sent. If the multiplexer is not free, the processor waits until it is free before loading these registers.

An 8-bit channel counter 78 is incremented by each pulse of the signal LD to cycle through all 256 channel addresses, a current channel number being present in the channel counter at any particular time. The current channel is identified throughout FIG. 3 by a hatched circle adjacent to register positions corresponding to the current channel. When the current channel is the channel whose number or address is stored in the register 72, a comparator 80 produces an output signal on a line 82, which with the signal LD=1, via an AND gate 84, resets the multiplexer status flip-flop 68 and causes the instruction stored in the register 74 to be executed. The multiplexer is then free to accept an instruction in respect of another channel.

The instruction stored in the register 74 can be any of a variety of possible instructions a detailed description of which is not necessary for a full understanding of this invention. It is observed, however, that these instructions may include instructions for determining whether or not a channel is free, testing or setting the status of a channel (channel status is discussed below), reading or resetting the CRC field of a channel, and resetting interrupts. To this end it is noted that for convenience the multiplexer status flip-flop 68, a two-bit portion 86 of a channel status register 88 described below, and a one-bit portion 90 of an interrupt register 92 described below may all form part of a single control/status register which is coupled to the processor data bus 70.

Figure 6A:
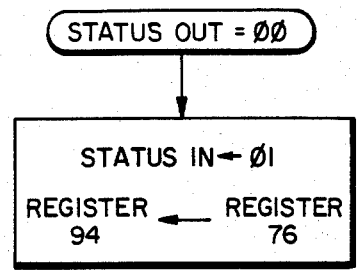

In the present case of an instruction to send a message, which would normally be loaded after establishing by an earlier instruction that the relevant channel is free, a flow chart for the execution of the instruction is illustrated in FIG. 6a. As shown, the status of the relevant channel is checked as described below, and if this is 00 then it is changed to 01 and a byte number register 94 is loaded with the number from the register 76 via a bus 96. This number corresponds to the low address byte of the location in the memory 66 in which is stored the first byte of the message to be sent.

The channel status is a two-bit number which is stored for each channel in the channel status register 88, this having 512 bit positions arranged as a cyclic shift register, the serial output of which is also supplied to the two-bit portion 86 of this register already referred to. The first two bit positions of the register 88 are coupled to STATUS IN lines 96 via which the status of a channel can be changed (for example in response to the signal FR=1 described above), the final two bit positions of the cyclic part of the shift register 88 provide a STATUS OUT' signal via lines 98, and the two-bit portion 86 provides a STATUS OUT signal via lines 100. The channel status register 88 is clocked by the signal SH. The channel status bits of each channel can have four possible values with the following meanings:

| Channel Status | Meaning |
| --- | --- |
| ØØ | Channel idle |
| Ø1 | Send opening flag |
| 1Ø | Sending message |
| 11 | Sending CRC field and closing flag |

It is observed here that the interrupt register 92 is generally similar in form to the channel status register 88, except that it has only one bit per channel and is clocked by the signal LD. The interrupt register 92 thus has a 256-bit cyclic portion in addition to the one-bit portion 90, interrupts being set for each channel via an INTR IN line 102 to the first bit position and being derived from the portion 90 via an INTR OUT line 104.

The byte number register 94 is also similar in general form to the channel status register 88 in that it is clocked by the signal SH and includes two serial bit positions for each channel in a cyclic portion 106 and a further two serial bit positions in a portion 108 which is coupled to the serial output of the portion 106. The byte number register 94, however, is 4 bits wide to accommodate an 8-bit low byte address for each channel. Furthermore, the register 94 includes a decrementing circuit 110 in its cyclic feedback path, which enables each low byte address to be reduced by 1 for each byte which is transmitted by the multiplexer. In addition, the first (current) channel location of the register portion 106 can optionally be loaded from the register 76 as described above, or from the output of the decrementing circuit 110, or with a preset value of 2, as described below, from a bus 112.

The current channel byte in the portion 108 of the register 94 is subjected to a zero test to provide a signal ZT=1 on a line 114 when this low address byte is zero. The low address byte of the next channel is supplied from a parallel output of the portion 106 of the register 94 to a bus 116. The channel number of this next channel is produced by incrementing the output of the channel counter 78 in a circuit 118. This channel number and the low address byte on the bus 116 together constitute an address for direct memory access (DMA) to the memory 66 for reading a byte therefrom as described below.

Figure 6B:
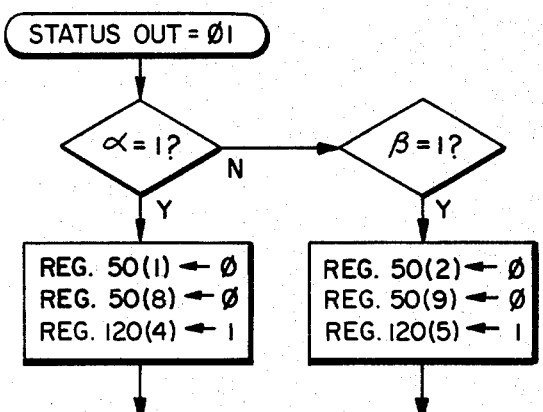

In response to the channel status Ø1 set as described above becoming the STATUS OUT on the lines 100, an opening flag is set up in the information register 50 if the channel is still free. A flow chart for this is illustrated in FIG. 6b. If the signal α=1, indicating that bit positions 1, 2, 3, ... 8 of register 50 are all "1", then bit positions 1 and 8 of this register are reset to "Ø" produce an opening flag Ø1111110 in bit positions 1 to 8. In addition, bit position 4 of a byte boundary register 120 (FIG. 3a) described below is set to "1". If the signal β=1, indicating that bit positions 2, 3, ... 9 of register 50 are all "1", then bit positions 2 and 9 of this register are reset to "Ø" to produce an opening flag in bit positions 2 to 9. In this case bit position 5 of the byte boundary register 120 is set to "1". In either case, the channel status is changed to 1Ø via the STATUS IN lines 96, and the relevant bit positions of a CRC (cyclic redundancy check) storage register 138 (FIG. 3c), described below, are reset to zero in order to initialize a CRC circuit 122 for the following message of the channel. If neither α=1 nor β=1, then the channel is no longer free and the sending of the message must wait until the channel again becomes free.

The byte boundary register 120 is a 2562-bit shift register which is clocked by the signal SH and whose serial input is supplied with a logic "Ø". This register is drawn immediately below the register 50 in FIG. 3a to illustrate the correspondence of bit positions between the two registers. For each channel for which a message to be sent is being inserted into the information register 50, a logic "1" is set in that bit position of the byte boundary register 120 which corresponds to the fifth-last bit of the byte of the channel in the information register 50. For the 8-bit opening flag, this is the fourth bit as described above. Otherwise, the byte boundary register contains logic "Ø" supplied via its serial input.

In order to achieve the necessary operating speed, operations in the multiplexer take place in a pipelined manner over a period of three pulses of the signal LD, as shown in FIG. 4. The three cycles are referred to as read, process, and write cycles, and as illustrated in FIG. 4 for a channel K these cycles take place sequentially in this order, with different cycles for different channels overlapping in time. Thus while a byte for the channel K is being processed as described below, a byte for the next channel K+1 may be being read from the memory 66, and a write operation may be taking place for the previous channel K−1.

The read, process, and write cycles correspond to signals RD=1, PR=1, and WR=1 respectively each produced simultaneously with the signal LD=1 by a respective one of three AND gates 124, 126, and 128 (FIG. 3a). The production of these signals is dependent upon the presence of a logic "1" in bit position 1 or 2 of the byte boundary register 120 for the signal PR=1, in one of the preceding two bit positions 1″ and 2″ of the register 120 for the signal RD, and in one of the following two bit positions 1′ and 2′ of the register 120 for the signal WR. To this end, OR gates 120, 132, and 134 are coupled respectively between the bit positions 1″, 2″ and the gate 124, the bit positions 1, 2 and the gate 126, and bit positions 1′ and 2′ and the gate 128. In addition, as shown in FIG. 3a signals α', β', α'', and β'' are produced corresponding to the contents of bit positions 2, 1, 2′ and 1′ respectively of the register 120.

When the logic "1" set in bit position 4 or 5 of the register 120 as described above reaches bit position 2″ or 1″ respectively, then with the signal LD=1 the gate 124 produces the signal RD=1 to effect a read cycle for the channel next following the current channel in the channel counter 78. A flow chart for the read cycle is shown in FIG. 6c.

Figure 6C:
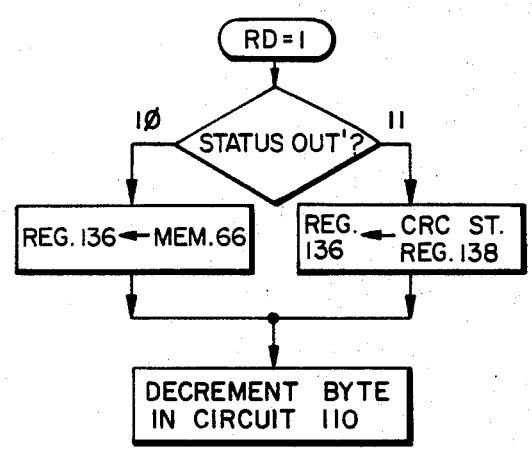

As illustrated in FIG. 6c, in response to the signal RD=1 the status of this next channel is checked via the STATUS OUT' lines 98. In this case the channel status is 1∅, and an 8-bit data register 136 (FIG. 3c) is loaded with the next byte of the message to be transmitted from the memory 66, which is addressed at this time by the appropriate address provided by the circuit 118 (FIG. 3b) and the bus 116 as already described above. The advanced reading from the memory 66 during the read cycle allows ample time (one cycle of the signal LD or 494ns) for the read operation to take place. Alternatively the channel status can be 11, in which case the data register 126 is instead loaded from the CRC storage register 138 (FIG. 3c) as described below. In either case the low address byte on the bus 116, corresponding to one less than the number of bytes of the message (or CRC field and closing flag) remaining to be sent, is decremented by the circuit 110.

With the next pulse of the signal LD the signal PR=1 is produced by the gate 126, and the signal $\mu'=1$ or the signal $\beta'=1$ is produced, by the logic "1" in bit position 2 or 1 respectively of the register 120. This corresponds to the process cycle for the current channel in the counter 78. Flow charts for the process cycle are illustrated in FIGS. 6d and 6e, FIG. 6d illustrating the processing of a byte which forms a part of the overall process cycle of FIG. 6e.

Figure 6D:
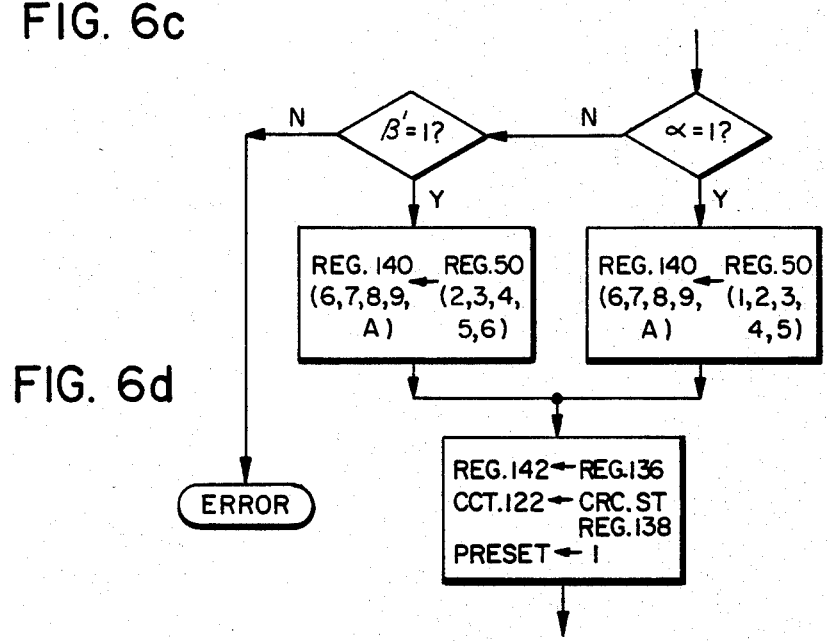
Figure 6E:
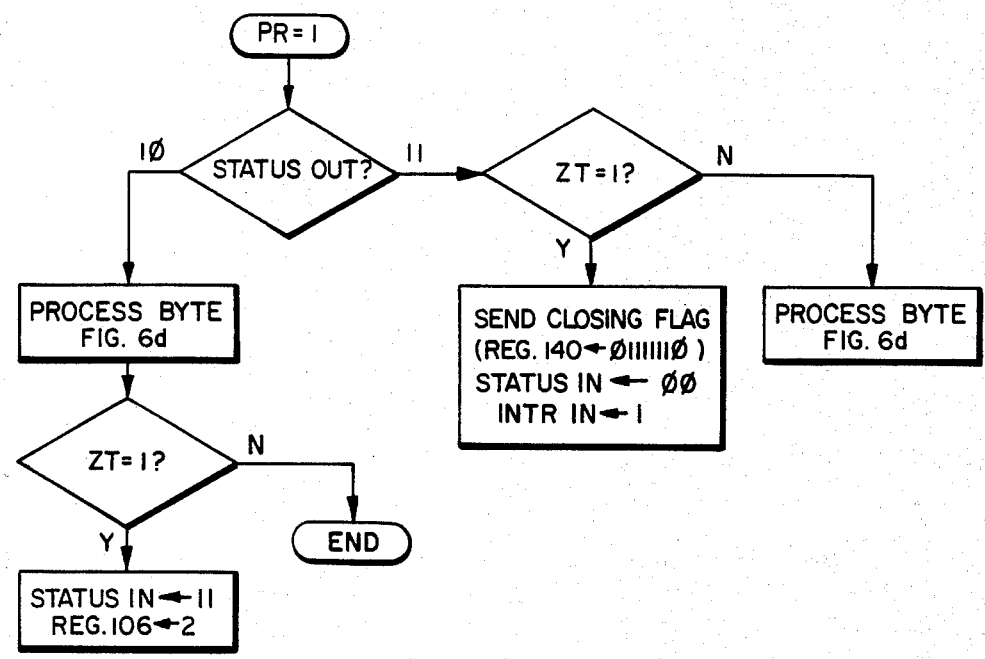

As shown in FIG. 6e, in response to the signal PR=1 the status of the current channel is checked via the STATUS OUT lines 100. In this case the channel status is 1∅, so that the byte of the current channel's message stored in the data register 136 is processed as illustrated in FIG. 6d and as described below. This processing provides the necessary updating of the CRC remainder for the channel and any necessary insertion of zero bits to avoid a sequence of more than five consecutive "1"s between the opening and closing flags.

As shown in FIG. 6d, if the signal $\alpha'=1$ bit positions 6, 7, 8, 9, and A of a 10-bit data register 140 (FIG. 3c) are loaded with the contents of bit positions 1, 2, 3, 4, and 5 respectively of the information register 50, whereas if the signal $\beta=1$ these bit positions of the register 140 are loaded with the contents of bit positions 2, 3, 4, 5, and 6 respectively of the register 50. If neither $\alpha'=1$ nor $\beta'=1$, then an error condition exists.

Thus the last five bits of a byte of the current channel being transmitted from the information register 50 are loaded in order into the first five bit positions 6 to A of the data register 140. In addition, as shown in FIG. 6d an 8-bit data register 142 (FIG. 3c) is loaded by the signal PR=1 with the byte contained in the data register 136, a 16-bit CRC remainder for the channel is transferred from the CRC storage register 138 into the CRC circuit 122 as described below, and a signal PRESET=1 is produced for a short period to preset counters as described below.

The CRC storage register 138 is a 4096-bit cyclic shift register which is clocked by the signal SH and stores a 16-bit CRC remainder for each channel in 8 pairs of adjacent bit positions, only some of which are represented in FIG. 3c for the current channel (unprimed numbers) and the preceding channel (primed numbers). The CRC circuit 122 includes a 16-bit shift register and Exclusive-OR gates arranged in a known manner as illustrated in FIG. 3c. In the process cycle, as described above, the CRC circuit 122 is loaded with the CRC remainder for the current channel from the CRC storage register 138, so that the CRC remainder can be updated. After updating, in the write cycle described below, the CRC storage register 138 is updated in that the updated CRC remainder is transferred from the CRC circuit 122 into the previous channel's bit positions (primed numbers) in the CRC storage register 138, thus maintaining the desired pipelined operation.

The signal PRESET=1 presets a down counter 144 (FIG. 3c) to a count of ten and a down counter 146 to a count of eight. A 30 MHz oscillator 148 has its output pulses supplied to one input of an AND gate 150, another input of which is enabled by an output of the counter 144 whenever the count of this counter is not zero. The output of the gate 150, at which a fast clock signal CK is produced, is supplied to a decrementing input of the counter 144, whereby each pulse of the signal CK reduces the count of the counter 144 by one. Consequently, each time that the counter 144 is preset, a series of ten pulses of the signal CK is produced. The timing of these pulses, relative to the signals SH and LD, is shown in FIG. 4. It is observed, however, that although FIG. 4 shows three sequences of pulses of the signal CK, in fact the production of each such sequence is dependent upon the signal PRESET=1, which in turn is dependent upon the positions of logic "1"s in the byte boundary register 120.

The signal CK is supplied to one input of a three-input AND gate 152, and to a clock input of the register 140. A five-input NAND gate 154 has its inputs connected to outputs of the bit positions 6, 7, 8, 9, and A of the register 140, and thus produces a logic "0" output whenever five consecutive logic "1"s appear in these bit positions of this register. The output of the gate 154 is connected to another input of the gate 152, an input of a two-input AND gate 156, and a clock input of a two-bit inserted bit register 158. This register 158 is reset to zero by the signal PRESET=1 and has a serial data input supplied with a logic "1", and parallel outputs producing signals $\gamma$ and $\delta$ whose function is described below.

The third input of the gate 152 is enabled by the counter 146 whenever the count of this counter is not zero. An output of this gate 152 is connected to a decrementing input of the counter 146, whereby the count of the counter 146 is reduced by one for each pulse of the signal CK which is passed through the gate 152. The gate 152 is inhibited by the output of the gate 154 whenever five consecutive logic "1"s occur in bit positions 6 to A of the register 140, but the arrangement is such that no more than two such sets of five consecutive logic "1"s can occur in any one process cycle, whereby the gate 152 is inhibited for not more than two of the ten pulses of the signal CK. The gate 152 thus produces at its output a sequence of eight of the pulses of the signal CK, which eight pulses are applied to clock inputs of the data register 142 and the CRC circuit 122. A serial data output of the data register 142 is connected to a serial input of the CRC circuit 122 and to the second input of the gate 156, whose output is connected to a serial data input of the data register 140.

Thus during the process cycle, in response to the presetting of the counters 144 and 146, the eight bits of the byte in the data register 142 are transferred serially into the data register 140, the contents of which are shifted (to the left as shown in FIG. 3c) for each of the ten pulses of the signal CK. At the same time, the CRC remainder is updated by the CRC circuit 122. If at any time five consecutive logic "1"s occur in bit positions 6 to A of the register 140, then a zero bit is inserted as the next bit by inhibition of the gates 152 and 156. For each zero bit which is inserted, a logic "1" is shifted into the register 158, whose outputs γ, δ at the end of the process cycle are ∅,∅; 1,∅; or 1,1 depending on whether no, one, or two zero bits respectively have been inserted. It should be noted from FIG. 4 that this all takes place between two consecutive pulses of the signal LD.

Before describing other possibilities which may occur in the process cycle, the write cycle is described below with reference to the flow chart in FIG. 6f.

The next pulse of the signal LD results in the signal WR=1 being produced by the gate 128, and the signal α″=1 or the signal β″=1 being produced, by the logic "1" in bit position 2' or 1' respectively of the byte boundary register 120. As shown in FIG. 6f, in response to the signal WR=1 the contents of the register 140 are loaded into register 50, into bit positions 7' to G' if α″=1 or into bit positions 6' if β″=1. In this manner the data byte, which was originally read from the memory 66, together with either two inserted zero bits, or one inserted zero bit and one following zero bit, or no inserted zero bits and two following zero bits, is written into the information register 50 in the correct position for transmission directly following the preceding byte of the channel.

Figure 6F:
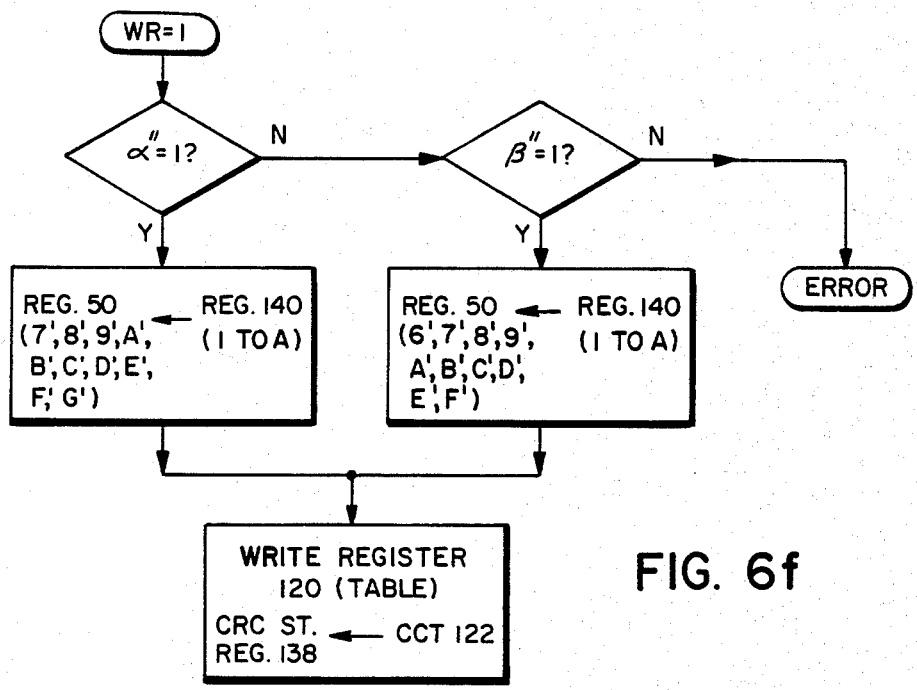

In addition, as shown in FIG. 6f, the updated CRC remainder in the CRC circuit 122 is transferred into the CRC storage register 138 as already described above, and a new byte boundary logic "1" bit is set in the byte boundary register 120. This logic "1" bit is set in that bit position in the register 120 which corresponds, as described above, with the fifth-last bit of the byte of the channel in the register 50. This fifth-last bit position depends not only on whether the signal α″=1 or the signal β″=1, but also on the length (8, 9, or 10 bits, excluding any following zero bits) of the byte including any inserted zero bits, and hence on the signals γ and δ produced by the register 158. Accordingly, the bit position in the register 120 which is set to logic "1" is given by the following table:

| No. of inserted zeroes | γ | δ | α″ | β″ | Reg. 120 bit set |
|---|---|---|---|---|---|
| 0 | 0 | 0 | 1 | 0 | A' |
| 0 | 0 | 0 | 0 | 1 | 9' |
| 1 | 1 | 0 | 1 | 0 | B' |
| 1 | 1 | 0 | 0 | 1 | A' |
| 2 | 1 | 1 | 1 | 0 | C' |
| 2 | 1 | 1 | 0 | 1 | B' |

Thus for each read, process, and write cycle sequence, occurring for each byte of the message for each channel inserted by the multiplexer, the byte boundary register is correctly set with a logic "1" in dependence upon the number of zero bits inserted into that byte.

The above described sequences continue for each byte of each channel being inserted. In addition, as shown in FIG. 6e, during the process cycle the signal ZT is checked to see whether the last byte in the memory 66 is being sent. If with the channel status 1∅, and the byte processed as in FIG. 6d as described above, the signal ZT=1 is produced indicating that the low address byte of the current channel in the portion 108 of the register 94 is zero, then as shown in FIG. 63 the channel status is changed to 11 via the STATUS IN lines 96, and the current channel position in the portion 106 of the register 94 is set to the value of 2 supplied via the bus 112. The channel status 11 corresponds to sending of the two-byte CRC field and the closing flag, and the value of 2 in the register 94 corresponds to the two CRC bytes and the closing flag to be sent (values 2, 1, and ∅ respectively).

As illustrated in FIG. 6c, in each read cycle (RD=1) for which the STATUS OUT' of the relevant channel on the lines 98 is 11, the data register 136 is loaded with 8 bits of the CRC remainder from the CRC storage register 138 instead of from the memory 66. As illustrated in FIG. 6e, in the following process cycle (PR=1), with the channel status being 11, the signal ZT is checked to determine whether the byte to be sent is a CRC byte or the closing flag. If the signal ZT≠1, i.e. if the current channel byte in the portion 108 of the register 94 is not zero, one of the two CRC bytes is to be sent and this is processed, with any necessary zero bit insertion, in the same manner as described above with reference to FIG. 6d.

After the two CRC bytes have been sent, the signal ZT=1 is produced to indicate as shown in FIG. 6e that the closing flag is to be sent. The sending of the closing flag is effected by setting the closing flag (∅1111111∅) directly into the data register 140, and not producing the signal PRESET=1. In the following write cycle, for which a "send closing flag" command is stored by means not shown, the closing flag is loaded in the manner described above into the correct position in the information register 50, and setting of a logic "1" in the register 120, and loading of the CRC storage register 138 from the CRC circuit 122, are inhibited. In addition, as shown in FIG. 6e, during the process cycle the channel status is changed via the STATUS IN lines 96 to ∅∅ to show that the channel is idle, and an interrupt flag is set in the current channel position of the interrupt register 92 via the INTR IN line 102, to interrupt the processor to signal that the message has been sent.

As already explained, the multiplexer described above serves for handling messages in the downstream direction from a packet data node 38 and CAM 34, FIG. 2a. For handling messages in the opposite, or upstream, direction, a complementary HDLC demultiplexer is required. FIG. 7 illustrates two applications of such a demultiplexer 160.

Referring to FIG. 7, upstream messages on a 256-channel multiplexed HDLC serial line 162 are supplied to the two demultiplexers 160, one of which is co-located with a CAM 164 as shown by a broken-line box 166 and the other of which is co-located with a remote packet data node 168 as shown by a broken-line box 170. Each demultiplexer 160 is arranged to respond only to HDLC frames which are intended for it, as defined by the first two address bits of the HDLC address field 12 as described below. For example, in a digital integrated customer access network the demultiplexer 160 associated with the CAM 164 may respond only to signalling and telemetry (s- and t-type) messages for processing by the CAM 164, whereas the demultiplexer 160 associated with the packet data node 168 may respond only to packet data (p-type) messages for processing by the node 168. All of the messages, s-, t-, and p-type, may be mixed on the line 162.

Each of the demultiplexers 160 co-operates with a processor and 64 Kbyte buffer memory of the associated CAM 164 or node 168 in a similar manner to that described above for the multiplexer 30, except for the reversed direction of transmission, and accordingly only those aspects of the demultiplexer which are different are described in detail below.

FIGS. 8a and 8b illustrate parts of a demultiplexer 160, and are collectively referred to below as FIG. 8. In addition, the demultiplexer 160 includes processor interface circuitry which is not shown but includes a demultiplexer status register, channel number register, instruction register, channel counter, and comparator arranged in a similar manner to the elements 68, 72, 74, 78, and 80 and associated circuitry of the multiplexer as shown in FIG. 3b. The demultiplexer 160 also includes a byte number register (not shown) which is similar to the register 94 of the multiplexer (FIG. 3b) but is initially reset and is incremented for each byte of a message which is received, the count of which register is supplied to the processor at the end of the message to indicate the length of the message. DMA of the processor's buffer memory is achieved by the demultiplexer 160 by addressing in a similar manner to that described above for the multiplexer.

Referring to FIG. 8, the serial data incoming from the line 162 is applied to a serial input of a 3586-bit information shift register 172 (FIG. 8a) and to a synchronizing and clock recovery circuit 174, which like the circuit 54 of the multiplexer 30 produces signals SH and LD. These signals are different from those of the multiplexer, but have the same timing relationship and functions and are therefore denoted by the same references. The information register 172 and other registers of the demultiplexer 160 described below have corresponding arrangements and functions, and are similarly clocked, to corresponding registers of the multiplexer, and accordingly the descriptions thereof are not repeated below.

The demultiplexer also includes a 2562-bit byte boundary register 176, corresponding to the register 120 of the multiplexer, to a serial input of which a logic "∅" is supplied and in which a logic "1" is set to indicate the relative position in the register 172 of a byte of each channel.

Two gates 178 and 180 enable detection by gates 182 and 184 respectively of HDLC opening flags which are followed by an address field 12 whose first two bits are 1 and ∅ respectively. The gate 182 detects the flag in bit positions 1 to 8 of the information register 172, to the outputs of which eight of its inputs are connected, and upon such detection sets a logic "1" in bit position 9 of the byte boundary register 176 via an exclusive-OR gate 186. A "1" in bit position 1 of the register 176 enables detection of a closing flag by the gate 184 via an OR gate 188, and prevents setting of bit position 9 of the register 176 via the gate 186. Between the opening and closing flags, the "1" in bit position 1 of register 176 causes the gate 186 to set a "1" in bit position 9 of register 176. Gates 178, 182, 190, and 192 operate similarly in conjunction with bit positions 2 and A of the register 176 and flags in bit positions 2 to 9 of register 172, provided that the opening flag is followed by address field bits 1 and ∅ in register 172 bit positions A and B respectively.

Thus the gates 178, 180, ... 192 enable detection by the demultiplexer of only a subset of all possible HDLC messages, namely those with an opening flag followed by an address whose first two bits are 1 and ∅ respectively. Opening flags followed by other address bits, and hence the subsequent messages, will be ignored. Different arrangements and inversions of the inputs of the gates 178 and 180 can be provided in different demultiplexers to respond to different initial address bit combinations, whereby different demultiplexers, such as those in the boxes 166 and 170 in FIG. 7, can be readily arranged to respond to different subsets of HDLC messages as is desired.

Furthermore, it is observed that instead of gates such as the gates 178 and 189 being hard-wired as illustrated in FIG. 8a, gating arrangements can be provided to enable detection of arbitrary combinations of address field bits following HDLC opening flags, the particular bit combinations being set up by means of a register loaded from the associated processor. In this manner, a single form of demultiplexer can be provided and programmed to respond to any desired set of address field bit combinations. For example in this respect, it is observed that in a similar manner to that described above for the multiplexer, an 8-bit register in the demultiplexer can be loaded by the associated processor with the ones-complement of the address bits which are to be detected following an HDLC opening flag. The relevant address bit positions of this register can be gated with the corresponding bit positions of the register 172 each in a respective exclusive OR gate, the outputs of these gates being combined in an AND gate whose output corresponds to the output of the gate 178 or 180 in FIG. 8a.

The outputs of bit positions 1 and 2 of the byte boundary register 176 are combined in an OR gate 194 to form a first bit, and the outputs of the gates 182 and 184 are combined in an OR gate 196 to form a second bit, of a two-bit channel status which is loaded into a channel status register 198 and is also decoded by a decoder 200. The register 198 is arranged similarly to the channel status register 88 of the multiplexer 30, but includes an additional two-bit parallel output stage 202 which is clocked by the signal LD and whose outputs are combined in an AND gate 204 to produce an interrupt signal INTR for the associated processor, indicating that a message has been received. Thus the signal INTR=1 is produced in response to a channel status of 11, which as shown by the decoder outputs occurs in response to receipt of a closing flag.

Receipt of an HDLC opening flag with the recognized address field bits results in a channel status of ∅1, in response to which the decoder 200 produces a RESET CHANNEL signal which resets a CRC circuit 206 (FIG. 8b). The RESET CHANNEL signal also resets the byte number register (not shown) to zero if it has not already been set to zero by the associated processor upon completion of reading from the DMA buffer memory a previous message for the same channel, and in such a case also produces an error signal to indicate that this previous message is being overwritten.

Between the opening and closing flags for each byte which is received, when a "1" appears in bit position 1 or 2 of the register 176, the channel status is 1∅, in response to which the decoder 200 produces a signal PROCESS to process the received byte. A delay flip-flop 208 produces a signal ADJUST one pulse of the signal LD after each PROCESS signal. The signals PROCESS and ADJUST provide a two-step pipelining for the demultiplexer, similar to the three-step (RD, PR, WR) pipelining for the multiplexer 30 as described above. In view of this pipelining, the outputs of bit positions 1 and 2 of the register 176 are clocked by the signal LD into a two-bit register 210 to produce signals ε and ξ respectively, and the outputs of the next two bit positions 1' and 2' produce signals α and β respectively.

In response to the signal PROCESS, a 16-bit data register 212 (FIG. 8b) is loaded with fifteen bits from the register 172, comprising the last five bits of the previous byte and ten bits (8 information bits and up to two inserted zero bits) for the current byte, from bit positions a to A or b to B of register 172 depending on the byte boundary "1" bit in the register 176, loaded into the corresponding bit positions of the register 212. Also in response to the signal PROCESS, the CRC circuit 206 is loaded with the stored CRC remainder for the channel from a CRC storage register 214, and a signal PRESET is produced to preset a down counter 216 to a count of eight.

In a similar manner to that described for the multiplexer, a 30 MHz oscillator 218 and gates 220 and 222 are arranged to produce, between successive pulses of the signal LD, eight pulses on a line 224, at the same time producing on a line 226 eight to ten shift pulses for the data register 212. In dependence upon the signals $\epsilon$ and $\xi$, gates 228, 230, and 232 detect sequences of five consecutive "1"s in bit positions a to e or b to 1 of the register 212. On detection of such a sequence, which must be followed by an inserted "0" bit, a "1" is shifted into an inserted bit register 234, having outputs $\gamma$ and $\beta$, and the gate 222 is inhibited for one pulse of the shift signal on the line 226. Pulses on the line 224 are supplied to shift clock inputs of the CRC circuit 206 and an eight-bit data register 236, serial data inputs of which are supplied with information bits from bit position 1 or 2 of the register 212, in dependence upon the signals $\epsilon$ and $\xi$, via gates 238, 240, and 242.

In this manner, the eight bits of a byte are shifted into the data register 236, and the CRC remainder in the CRC circuit 206 is updated accordingly. In response to the following ADJUST signal produced as described above, the CRC storage register 214 is updated from the CRC circuit 206, a data register 244 is loaded with the byte from the register 236, and the byte number register (not shown) is incremented so that this byte is correctly loaded into the processor's buffer memory by DMA. In addition, the ADJUST signal sets a "1" bit in the register 176 to denote the boundary of the next byte in accordance with the following table:

| No. of inserted zeroes | $\gamma$ | $\delta$ | $\alpha$ | $\beta$ | Reg. 176 bit set |
|---|---|---|---|---|---|
| 0 | 0 | 0 | 1 | 0 | 9' |
| 0 | 0 | 0 | 0 | 1 | A' |
| 1 | 1 | 0 | 1 | 0 | A' |
| 1 | 1 | 0 | 0 | 1 | B' |
| 2 | 1 | 1 | 1 | 0 | B' |
| 2 | 1 | 1 | 0 | 1 | C' |

The remainder of the operation of the demultiplexer will be clear from the above description and its similarity with the operation of the multiplexer. The CLOSING FLAG signal produced by the decoder 200 is in this case not used; it can, however, be used for diagnostic purposes.

The multiplexer and demultiplexer described above can each be formed as two integrated circuits, one using TTL circuitry for those parts which are operated at the relatively high clock frequency of 30 MHz, and the other using MOS technology for the majority of the arrangements operating at the lower clock frequency of 4.096 MHz. The comparable parts of the multiplexer and demultiplexer can conceivably be combined into single integrated circuit devices, in which case certain components, such as the 30 MHz oscillator, can be provided commonly for the multiplexer and demultiplexer.

Although particular forms of multiplexer and demultiplexer have been described in detail, it should be appreciated that the invention is not limited thereto, and numerous modifications, variations, and adaptations may be made thereto without department from the scope of the invention as defined in the claims.

What is claimed is:

1. Apparatus for transmitting messages from a plurality of channels in a time division multiplexed serial bit stream using bit oriented protocol frames, each frame comprising at least an opening flag byte and a plurality of message bytes comprising bytes of a message of a respective channel to be transmitted, the flag byte comprising a sequence of a predetermined number of consecutive 1 bits and the bits of the message bytes being subject to zero bit insertion whereby occurrence of the flag byte within the message is avoided, the apparatus comprising:

first and second memory means;
means for deriving said serial bit stream from the first memory means;
means responsive to a message of a channel to be transmitted for storing a flag byte in the first memory means and for storing in the second memory means an indication of the relative position in the first memory means of the flag byte; and
means, responsive to said indication stored in the second memory means as said serial bit stream is derived from the first memory means, for:
 providing a message byte to be transmitted; effecting said zero bit insertion;
 storing the byte with any inserted zero bits in the first memory means; and
 updating said indication stored in the second memory means in dependence upon the number of inserted zero bits.

2. Apparatus as claimed in claim 1 and including third memory means for storing CRC (cyclic redundancy check) data for each channel, and a CRC circuit for updating the CRC data in dependence upon each byte of a message being transmitted, wherein the means responsive to a message of a channel to be transmitted comprises means for resetting the CRC data for the channel in the third memory means, and the means responsive to said indication stored in the second memory means comprises means for loading the CRC data from the third memory means into the CRC circuit, updating the CRC data in the CRC circuit in dependence upon the message byte to be transmitted, storing the updated CRC data in the third memory means, and transmitting the CRC data in the serial bit stream following the bytes of the message to be transmitted.

3. Apparatus as claimed in claim 2 and including means for storing a flag byte in the first memory means for transmission in the serial bit stream following the CRC data.

4. Apparatus as claimed in claim 1 and including means for storing an incoming serial bit stream, having the same format as the outgoing serial bit stream derived from the first memory means, in the first memory means, said incoming serial bit stream comprising a sequence of all 1 bits for each channel which is idle, wherein the means for storing a flag byte in the first memory means in respect of a channel is responsive to said bits in the first memory means to store said flag byte only in respect of the channel when it is idle.

5. Apparatus as claimed in claim 1 wherein the means for providing each message byte to be transmitted comprises a buffer memory for storing message bytes to be transmitted, fourth memory means for storing for each channel a count of the number of bytes of a message to be transmitted; means responsive to said indication stored in the second memory means for reading a message byte from said buffer memory at an address dependent upon said count, and for decrementing said count; and means for detecting when said count has been decremented to zero indicating reading of all of the bytes of the message.

6. Apparatus as claimed in claim 1 wherein said serial bit stream is derived from the first memory means with the bits of the plurality of channels time division multiplexed in pairs.

7. Apparatus as claimed in claim 1 wherein the first and second memory means comprise shift registers and the means for deriving said serial bit stream from the first memory means comprises means for shifting data in the first and second memory means at the bit rate of said serial bit stream, said serial bit stream being derived from a serial output of the first memory means.

8. Apparatus as claimed in claim 2 wherein the third memory means comprises a cyclic shift register.

9. Apparatus as claimed in claim 5 wherein the fourth memory means comprises a cyclic shift register.

10. Apparatus as claimed in claim 1 wherein there are 256 time division multiplexed channels in said serial bit stream.

11. Apparatus as claimed in claim 1 wherein the means for effecting said zero bit insertion and storing the byte in the first memory means comprises:

fifth memory means;

means for producing a message byte to be transmitted, with any inserted zero bits, bit sequentially in the fifth memory means at a rate which is substantially higher than the bit rate of said serial bit stream, and for counting the number of inserted zero bits; and means for storing the mesage byte produced in the fifth memory means in the first memory means at a location dependent upon the count of the number of inserted zero bits.

12. Apparatus as claimed in claim 11 wherein the fifth memory means comprises a shift register.

* * * * *